United States Patent
Flenner

(10) Patent No.: US 8,509,546 B1
(45) Date of Patent: Aug. 13, 2013

(54) LEVEL SET TREE FEATURE DETECTION

(75) Inventor: Arjuna Flenner, Claremont, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 430 days.

(21) Appl. No.: 12/807,373

(22) Filed: Aug. 24, 2010

Related U.S. Application Data

(60) Provisional application No. 61/255,528, filed on Oct. 28, 2009.

(51) Int. Cl.
*G06K 9/68* (2006.01)

(52) U.S. Cl.
USPC ........... 382/226; 382/224; 382/225; 382/103; 382/128; 382/227; 345/582; 345/474

(58) Field of Classification Search
USPC ......... 382/103, 133, 128, 132, 226; 345/582, 345/474
See application file for complete search history.

(56) References Cited

PUBLICATIONS

Ballester et al: "Level lines selection with variational models for segmentation and encoding", J. Math Imaging, 2007.*
Ballester et al: "Contrast invariant image intersection", in Deremade, 1998.*
Arjuna Flenner, Gary A. Hewer, & Charles S. Kenney, "Two Dimensional Histogram Analysis Using the Helmholtz Principle," American Inst. of Math. Sciences, Nov. 2008, V2, No. 4.
Arjuna Flenner & Gary Hewer, "Extension of the Helmholtz Principle to the Hypergeometric Distribution for Change Detection and Coherent Motion," Submitted Sep. 2009,not published.

* cited by examiner

*Primary Examiner* — Kim Vu
*Assistant Examiner* — Ruiping Li
(74) *Attorney, Agent, or Firm* — James M. Saunders

(57) ABSTRACT

A level set tree feature detection machine is disclosed along with a method for detecting a level set tree feature. At least one pixilated image is provided. An electronic model is generated of the pixilated images. Maximal meaningful nodes for the pixilated images are determined.

14 Claims, 7 Drawing Sheets

LEVEL SET TREE FEATURE DETECTION

CROSS-REFERENCE TO RELATED APPLICATIONS

This is a non-provisional application, claiming the benefit of, parent provisional application No. 61/255,528 filed on Oct. 28, 2009, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a parameter free technique to find changes between images, and more particularly, a statistical analysis method to determine when one image exists within another.

Figure 1:
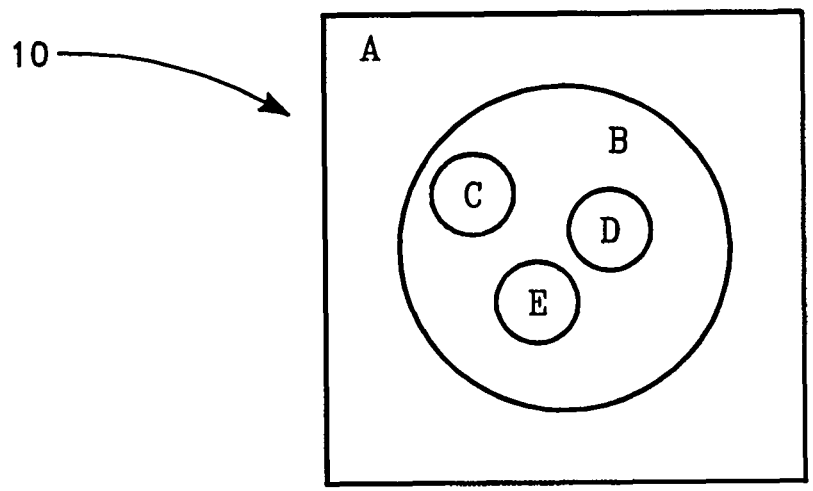
FIG. 1 illustrates a grouping of images within another image, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

The invention generally relates to a parameter free technique to find changes between images, and more particularly, a statistical analysis method of decomposing an image to determine when one image or shape is contained within another. The invention uses the Helmholtz principle to find changes in an input image in situations where only one or two images are available to build a background model. The Helmholtz principle locates image regions that are unlikely to occur due to an a-priori random image generation model and it assigns a confidence level to each changed region. The invention examines pixilated images and categorizes those pixels that are "meaningful" and those that are "not meaningful." Meaningful is the term given to changes within the pixels that are of interest to the end user of the data and that are categorized as "not noise." Everything else is considered not meaningful and is considered "noise."

In military applications, various surveillance techniques are employed to determine when changes occur amongst images taken over discrete time intervals. Some techniques employ sensors using electrical optical methods, including as those used in digital cameras. These methods generate voluminous amounts of data and, currently, only 20 to 30 percent of the data is analyzed because analysts have to view images and determine when changes of interest occur. There currently are not enough analysts to monitor all data from all images.

There exists a need in the art for an automated tool to analyze image data and relay changes that occur amongst images to an end user of the data. Specifically, a tool is needed that reduces a large data set to a smaller set of only features that the end user is interested in, or rather, a tool that only shows images where changes occur or where motion exists. It is in view of the above problems that embodiments of the invention was developed.

Although embodiments of the invention are described in considerable detail, including references to certain versions thereof, other versions are possible. Examples of other versions include performing the steps in an alternate sequence, reconstructing the loops to populate data structures in different order, or hosting a program on a different platform. Therefore, the spirit and scope of the appended claims should not be limited to the description of versions contained herein.

Embodiments of the invention may take the form of a computer program product on a computer-usable storage medium having computer-usable/readable program instructions embodied in the medium. Any suitable computer readable medium may be utilized including either computer readable storage mediums, such as, for example, hard disks, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C" programming language. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instruction means that implement the function/act specified in the flow chart and/or block diagram block or blocks.

These computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flow chart and/or block diagram block or blocks.

Referring to the accompanying drawings in which like reference numbers indicate like elements, FIG. 1 illustrates a grouping of images within another image, collectively shown as reference character 10. As depicted in FIG. 1, image A contains image B. Image B contains images C, D, and E.

Figure 2:
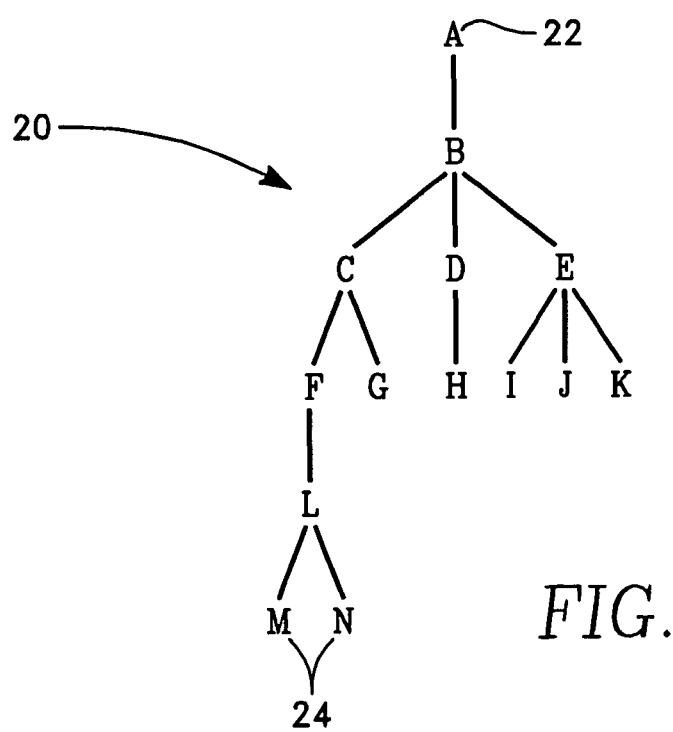
FIG. 2 illustrates a generic containment tree structure, according to embodiments of the invention.

FIG. 2 illustrates a generic containment tree structure, collectively shown as reference character 20. The generic containment tree structure can also be described as a level set. As depicted, letters A through N are nodes. In computer science, a node is an abstract basic unit used to build linked data structures including trees, linked lists, and computer-based representations of graphs. Each node includes some data and possibly links to other nodes. By forming chains of interlinked nodes, very large and complex data structures can be formed.

As depicted in FIG. 2, A is a root 22, sometimes referred to as a parent of other nodes. Working down the containment tree structure 20, from top to bottom, B is a child of A. C, D, and E are children of B. Similarly, F and G are children of C. The root 22 descendents are nodes B through N. Nodes M and N are leaves 24 of the containment tree structure 20. Singularly, nodes M and N would be called a leaf.

Working from bottom to top in the containment tree structure 20, node M has ancestors of L, F, C, B, and A. Since node A is the root 22, it is an ancestor of all nodes as depicted in the containment tree structure 20.

Figure 3:
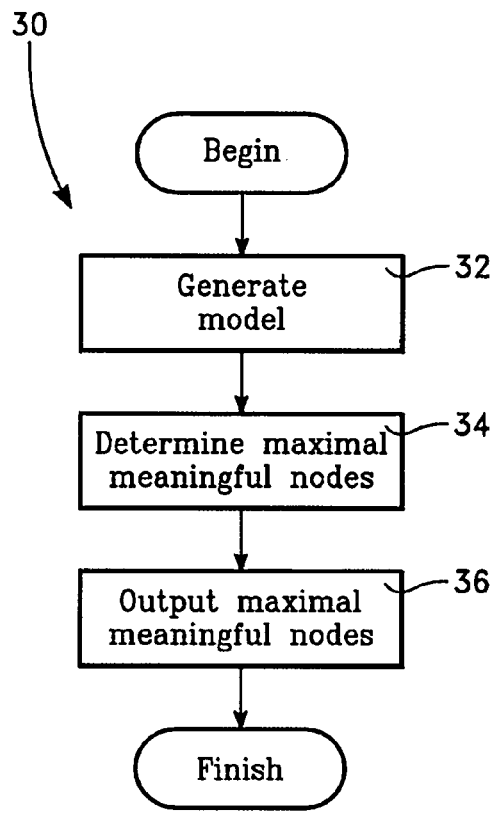
FIG. 3 illustrates a block process diagram of a level set tree feature detection, according to embodiments of the invention.

FIG. 3 illustrates an embodiment of a level set tree feature detection, depicted as reference character 30. At least one pixilated image is provided. A model is electronically generated (step 32) of the pixilated images. Maximal meaningful nodes are determined (step 34) from the electronically generated model (step 32). The maximal meaningful nodes are then output in a tangible medium (step 36). Output includes hard copy printouts, other computer accessible medium such as computer hard drives or floppy discs, visual display screens, as well as other mediums employing identified target coordinates.

Two pixilated images are used for change detection. Three pixilated images are used for coherent motion. One image is used for histogram analysis.

Change detection involves determining the significant differences between imagery taken at different times where the changes occur faster than the image frame rate. There are many inherent problems in change detection, including viewpoint, illumination, and nuisance change effects. These problems include difficulties with registration of the images, lighting changes (global and local) as well as changes caused by wind, rain, etc. Furthermore, the exact definition of change is application dependent.

An aspect of the invention is that sampling without replacement is possible. In sampling without replacement, a sample cannot be chosen twice after it has first been selected. The sample, after being selected is pulled out of the data set and is, therefore, no longer included as a possible future sample. Both change detection and coherent motion employ sampling without replacement. Histogram analysis uses sampling with replacement. Sampling with replacement places a previously selected sample back into the set of samples and, therefore, a sample may be selected more than once.

An exchangeable background mode used for change detection is a hypergeometric distribution. The hypergeometric model assumes that a fixed number of changed pixels are placed one at a time onto the image where no two changed pixels occupy the same pixel location. This is a sampling without replacement model since the background model assumes that the locations of the changed pixels on the image are chosen without sampling the same location twice.

Change detection analysis is associated with comparing one image to another, such as examining two images, one with a car present and another with the car missing. The objective of change detection can be summarized as follows. Given a family of images from the same scene taken at different times, the goal is to label the set of pixels that are significantly changed in one of the images, the input image, compared with the rest of the images, a family of background images. The set of changed pixels is called a change mask, and the change mask is itself a binary image. Statistical analysis is performed on each image in change detection analysis.

Coherent motion is associated with frames from video streams, including where the three images occur at the same time scale at which the change occurs. The changes are more subtle in coherent motion than in change detection. Coherent motion analysis determines where there are grouping regions of concentrated white pixels. Statistical analysis is performed on a middle image in coherent motion analysis.

In histogram analysis, data is organized into an array of bins based on the frequency of occurrence of the data. Histograms are often used for density estimation, estimating the probability density function of the underlying variable. The data can be based on color, texture, and edges, but it is not limited to these features. For example, commonly occurring colors are associated with taller histogram peaks, and edge analysis examines the image for highly contrasted pixels. Textures have many edges in the image, so the object being analyzed does not appear as sharp. Texture analysis examines oscillatory behavior attributes including background matter, such as, for example, pebbles or sand in the image.

The classic probability model of randomly placing M indistinguishable objects into N bins is a natural model for two dimensional histogram creation. When each object is equally likely to be placed in any bin, then the probability of a ball ending up in a given bin is 1/N. Since the balls are indistinguishable, the simple events correspond to N-tuples $(n_1, n_2, \ldots, n_N)$ where $n_i$ is the number of balls in the $i^{th}$ bin. The model is completed by deriving the probabilities for the compound events corresponding to the grouping procedure.

The grouping procedure works in conjunction with the a-contrario hypothesis model to describe a feature's absence. Fundamentally, the grouping procedure identifies compound events that accurately characterize the feature. The features of histograms are modes of the histogram. Histogram modes can be qualitatively understood as connected sets in the histogram's domain where data concentrates. The qualitative notion of modes suggests the following compound event. Consider a histogram h: N→Z where N={(1,1), (1,2), ..., $(L_1, L_2)$} is the histogram domain. Let I⊂N be a connected set, and define $$k(I) = \sum_{x \in I} h(x).$$

The set function k(I) is the number of objects in I. The notation |I| represents the number of elements in the set I. The probability that at least k(I) elements are in the connected region I is given by the binomial tail $$B(M, k(I), p(I)) = \sum_{j=k(I)}^{M} \binom{M}{j} p(I)^j (1 - p(I))^{(M-j)},$$

where p(I)=|I|/N. This model is a Bernoulli scheme with M trials and a probability of success of p(I).

A fast level set transform, a type of level set tree structure, is generated from the pixilated images. The fast level set transform is used to reduce the number of merging candidates by imposing data into a graphical structure. Fast level set transforms are useful for detecting sets with arbitrary shapes, which makes them useful for image and shape analysis.

Image level set decomposition is a morphological image representation that provides a graphical tree structure that is exploited to find maximal meaningful sets. Two features of this representation are used in maximal ϵ-meaningful algorithms. First, at a fixed gray level, this representation partitions the image into connected non-overlapping regions. Second, as the gray level changes, the connected components are ordered by a containment tree structure.

Consider the level sets of a continuous real valued function h: $\mathbb{R}^2 \to \mathbb{R}$. Let $\lambda \in \mathbb{R}$ and define the upper level set $\chi_\lambda$ and the lower level set $\chi^\lambda$ of h as $$\chi_\lambda = \{x \in \mathbb{R}^2 | h(x) \geq \lambda\},$$

$$\chi^\lambda = \{x \in \mathbb{R}^2 | h(x) < \lambda\}.$$

Since h is a function, the level sets have a natural inclusion structure given by $$\lambda_1 \geq \lambda_2 \Leftrightarrow \chi_{\lambda_1} \subseteq \chi_{\lambda_2},$$

$$\lambda_1 < \lambda_2 \Leftrightarrow \chi^{\lambda_1} \subseteq \chi^{\lambda_2}.$$

Both the upper and lower level sets are contrast invariant morphological representations of an image. These representations decompose the image into distinct regions for fixed λ, but the level sets by themselves lack some useful topological information. The Fast Level Set Transform (FLST) tree, organizes the connection between the upper and lower level sets as well as the level set containment properties. The set containment topological information is encoded through the parent-child relationship. Both the upper and lower level sets are complete representations of an image, but there is redundant information if both level sets are used. These two representations have been combined into one tree structure by, which is the FLST.

Figure 4:
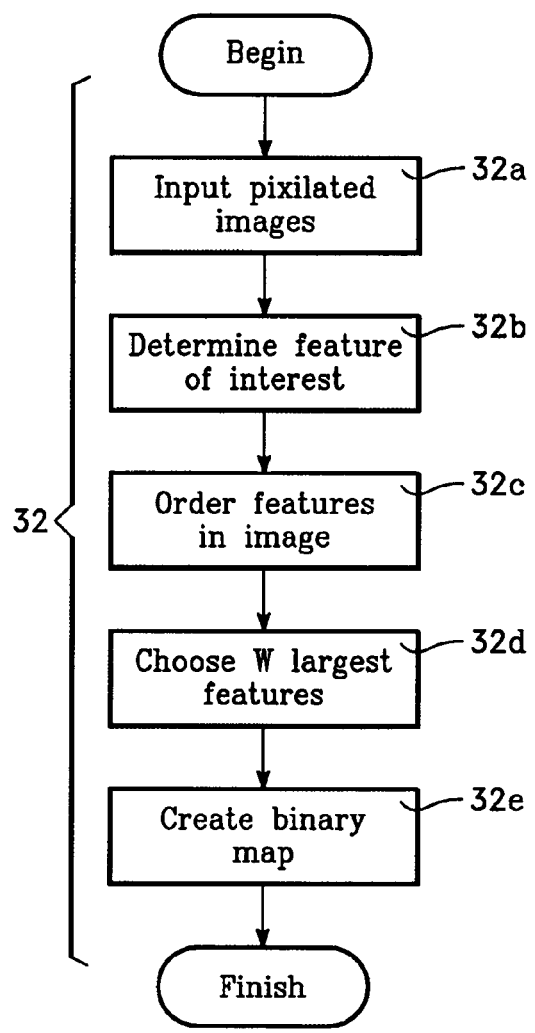
FIG. 4 illustrates a block process diagram of generating an electronic model, according to embodiments of the invention.

FIG. 4 illustrates the electronic model generation (step 32). The pixilated images are input into a computer (step 32a). The inputted pixilated images may come from a human user inputting the images as well as other sources. The pixilated images may be input through a graphical user interface or other devices such as by digital camera feeds or video screen feeds. Hence, the pixilated images may be automatically inputted into the computer.

A feature of interest is determined (step 32b). The feature of interest is normal residue motion observed between the two pixilated images in change detection or amongst the three pixilated images in coherent motion. The normal residue motion is the differences observed between and amongst the pixilated images on a per pixel basis.

Normal residue motion is shown in maximal meaningful node output as white pixels. The number of white pixels is identified as W, where W is between about five and ninety-five percent of the total number of pixels, represented by N, of the pixilated images. The greatest differences or features of interest are designated as the W largest pixels. The features are ordered (step 32c) based on the number of observed differences and the areas with the W largest pixels are chosen (step 32d).

The observed differences are categorized as "not noise," while the areas without discernable changes in the pixilated images are designated as "noise." "Noise" represents background data within the images. "Not noise" represents an observed change between two images in change detection or amongst three images in coherent motion. "Not noise" in histogram analysis represents dominant color, texture, or edge contrasts.

A binary map is created (step 32e) of the pixilated images. The original pixilated images come in 32, 64, 128, ... bits. The original pixilated image is mapped into a 1 bit binary image for each pixel. Each of the W pixels is assigned a binary value of one.

Figure 5A:
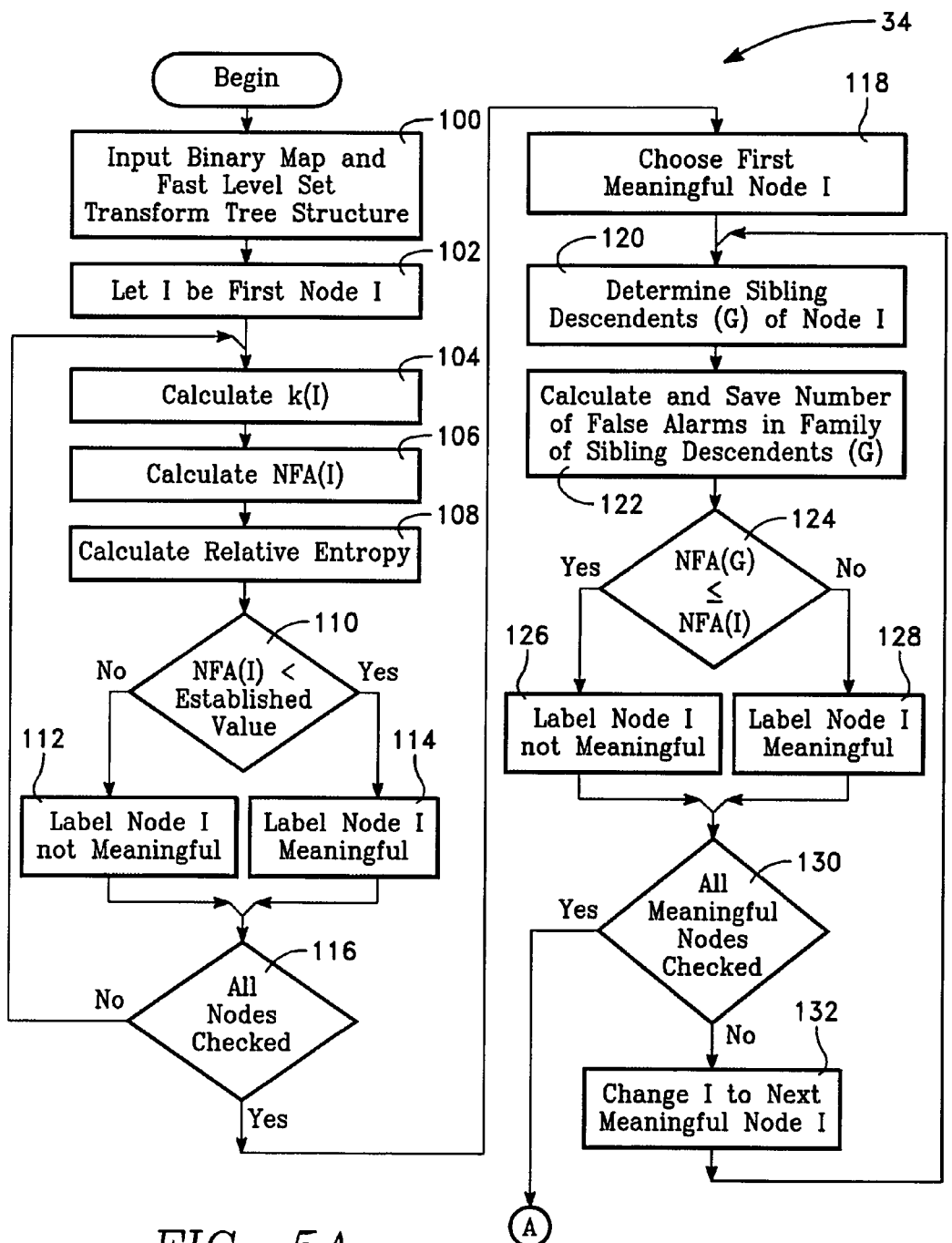
FIGS. 5A & B illustrate a block process diagram of determining maximal meaningful nodes, according to embodiments of the invention.
Figure 5B:
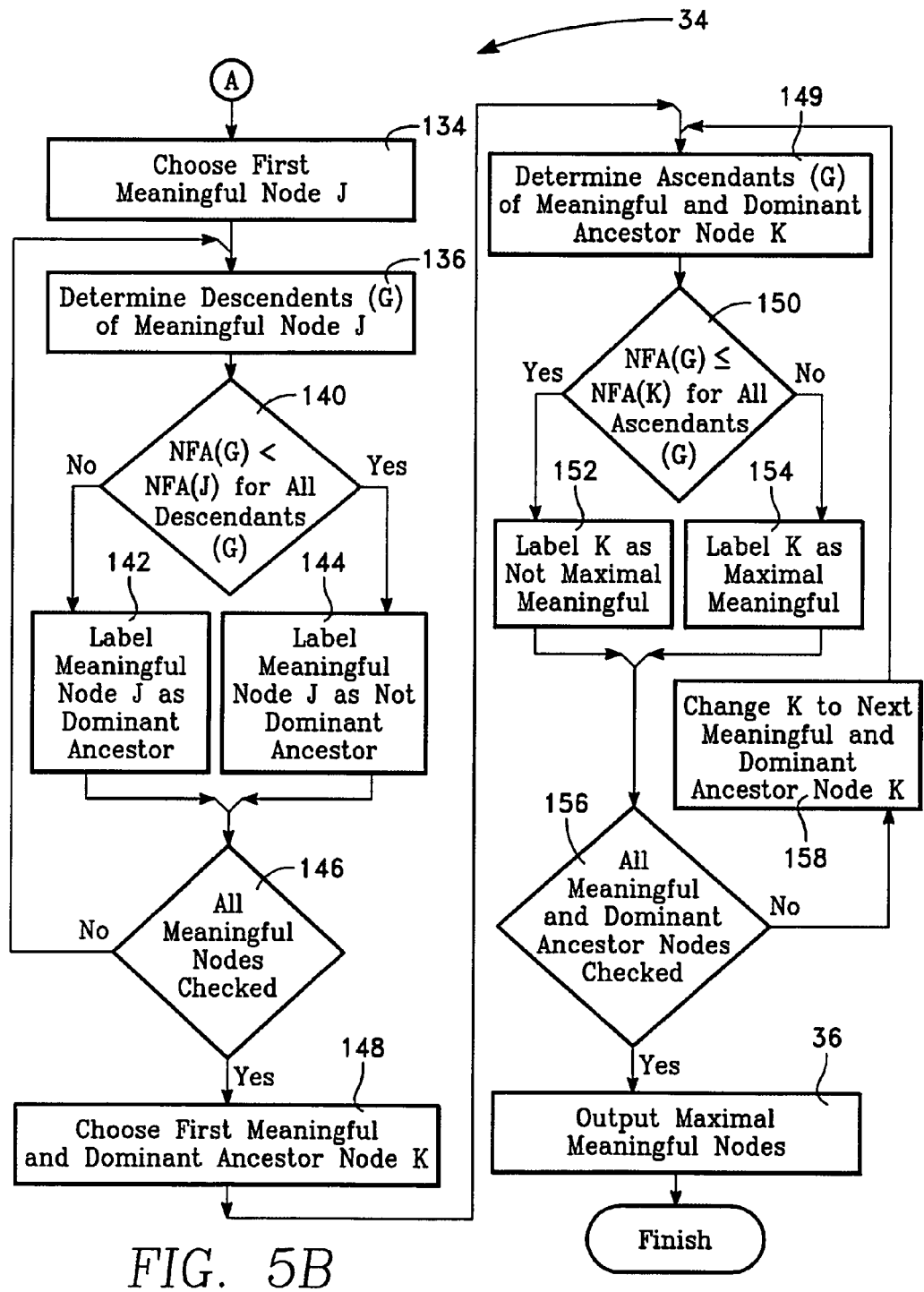

FIGS. 5A & B illustrate a block process diagram of determining maximal meaningful nodes and are joined together by the connector A, shown on the bottom of FIG. 5A and the top of FIG. 5B. Determination of the maximal meaningful nodes (step 34) includes calculating node values based on statistical differences amongst the pixilated images. To calculate statistical differences and determine the maximal meaningful nodes, steps 100 through 158 are performed.

Steps 100 through 116 calculate important qualities of each node and determine if a set of nodes is ϵ-meaningful. When ϵ=1, a set I with NFA(I)<ϵ=1 is called a meaningful set.

The binary map and fast level set transform tree structure are input (step 100). "I" is designated as the first node and a node is selected from a set of nodes $\{I_1 \ldots I_n\}$ (step 102). An observed number of white pixels, designated as k(I), is calculated in a region corresponding to the selected node I (step 104).

A number of false alarms for the node is designated as NFA(I). The number of false alarms is calculated for the selected node (step 106). The number of false alarms is stored for the selected node in an electronic storage device.

To understand the number of false alarms concept, one must examine probability tail bounds. The probability tail bound used for change detection and coherent motion is the hypergeometric distribution, while histogram analysis uses the binomial and multinomial distributions. The appropriate tail bounds for the hypergeometric distribution can be characterized by the following. Assume that there exists N total pixels in an initial change mask and that each pixel can be either white or black where white represents a changed pixel and black an unchanged pixel. Suppose W pixels are white and N-W pixels are black. The integers N and W serve as parameters for the distribution. The probability that z pixels drawn from the initial change mask has k white objects is given by the hypergeometric distribution $$f(k; N, W, z) = \frac{\binom{W}{k}\binom{N-W}{z-k}}{\binom{N}{z}}.$$

The tail of the Hypergeometric, H(k;N,W,z), follows $$H(k; N, W, z) = \sum_{j=k}^{n} f(j; N, W, z).$$

The hypergeometric distribution is a sampling without replacement counterpart to the binomial distribution, and when the ratio β=n/N is small, the hypergeometric distribution is well approximated by the binomial distribution.

There are three ratios that play very distinct roles in the subsequent analysis. First, the a-priori probability p=W/N is fixed for every sample of z pixels. The second parameter is the empirical probability r=k/z. This is the observed number of white pixels in the sample of size z. A third ratio, given by β=z/N, distinguishes the hypergeometric distribution from its sampling with replacement counterpart, the binomial distribution. When β=1, the whole image is sampled and k is known, and β is viewed as a measure of randomness.

A complete description of the probability space and the NFA function is better understood with a description of a grouping procedure that works in conjunction with the a-contrario hypothesis model to describe a feature's absence. Fundamentally, it identifies compound events that accurately characterize the feature. The grouping procedure must be well described in all applications, but a general definition of the NFA function can be given without reference to the grouping method. This generality is pursued to emphasize that the use of the hypergeometric distribution is not a special case for change detection, but may have many other applications.

Let R denote the family of possible groups as determined by the grouping procedure. An element I∈R symbolizes a set. The notation |R| will equal the number of groups in R and |I| will equal the number of elements in I∈R. The number of false alarms (NFA) of a set I∈R is given by the following definition.

Let I∈R,N,W∈Z with W<N. Suppose |I|=z and let k(I) represent the observed number of white objects in I. The number of false alarms of I is NFA(I)=|R|H(k(I);N,W,z). This definition leads directly to the notion of an ϵ-meaningful set.

A set I∈R is an ϵ-meaningful set if and only if k(I)/z>p and NFA(I)<ϵ. When ϵ=1, a set I with NFA(I)<ϵ=1 will be simply called a meaningful set. The condition k(I)/z>p is present since only sets with more white elements than is expected will be designated as meaningful. This is appropriate for change detection algorithms since white pixels correspond to changed pixels in the initial change mask.

The NFA serves as an upper bound on the expected number of occurrences of the set I∈R given the a-contrario model. Furthermore, the |R| scale factor implies that the NFA scales appropriately with the image size.

The expected number of ϵ-meaningful sets is less than or equal to ϵ. The practical importance of this should not be overlooked. The variable ϵ serves as a modifiable parameter to investigate the sensitivity of maximal meaningful node computation. Unlike many parameters, however, ϵ is easily interpretable as a bound on the expected number of false alarms in the image.

Computational difficulty is inherent in the many calculations of the hypergeometric function. This difficulty is mitigated by the invention 30 by using a tight upper bound on the hypergeometric tail.

An upper bound to the hypergeometric distribution tail depends on an extension of the hypergeometric distribution to the situation when W=Np can be any real number. This extension is obtained using the generalized binomial coefficients. The Chu-Vandermonde identity can be used to show that the relation $$\sum_{k=0}^{z} f(k; N, p, z) = \frac{\binom{Np + N(1-p)}{z}}{\binom{N}{z}} = 1.$$

This demonstrates that the extension is a probability distribution.

By letting p, r∈[0,1] with p<r, the ordering relationship $$\frac{H(k; N, p, z)}{f(k; N, p, z)} < \frac{H(k; N, r, z)}{f(k; N, r, z)}$$

holds.

This is proven by showing that the ratio H(k;N,p,z)/f(k;N,p,z) is an increasing function of p. The definitions of H(k;N,p,z) and f(k;N,p,z) gives $$\frac{H(k; N, p, z)}{f(k; N, p, z)} = \sum_{j=k}^{z} \frac{\binom{Np}{j}\binom{N(1-p)}{z-j}}{\binom{Np}{k}\binom{N(1-p)}{z-k}} =$$

$$1 + \frac{1}{\binom{z}{k}} \sum_{j=k+1}^{z} \binom{z}{j} \frac{(Np-k)\ldots(Np-j+1)}{(N(1-p)-(z-j))\ldots(N(1-p)-(z-k)+1)}.$$

For each term of the previous equation, there are j-k factors in the numerator and j-k factors in the denominator. Each factor in the numerator can be associated with one factor in the denominator in the form $$\frac{Np - k - a}{N(1-p) - (z-j) - (j-k-a)},$$

where a∈{0,1,...,j-k}. The above function is of the form (np-C)/(D-Np) for some constants C and D; thus it is an increasing function in p. Since $$\frac{H(k;N,p,z)}{f(k;N,p,z)} = \sum_{j=k}^{z} \frac{\binom{Np}{j}\binom{N(1-p)}{z-j}}{\binom{Np}{k}\binom{N(1-p)}{z-k}} =$$

$$1 + \frac{1}{\binom{z}{k}} \sum_{j=k+1}^{z} \binom{z}{j} \frac{(Np-k)\dots(Np-j+1)}{(N(1-p)-(z-j))\dots(N(1-p)-(z-k)+1)}$$

is the sum of products of increasing functions of p, then $H(k;N,p,z)/f(k;N,p,z)$ is an increasing function of p.

A non-asymptotic upper bound on the hypergeometric distribution tail is proven by the following. Suppose $r=k/z$, $p=W/N$, and $p<r$. The tail of the hypergeometric distribution $H(k;N,p,z)$ is bounded by $$H(k;N,p,z) \leq \frac{\binom{Np}{zr}\binom{N(1-p)}{z(1-r)}}{\binom{Nr}{zr}\binom{N(1-r)}{z(1-r)}}.$$

Note that $$H(k;N,p,z) = \frac{H(k;N,p,z)}{f(k;N,p,z)} f(k;N,p,z) \quad \text{Domain Expansion}$$

$$\leq \frac{H(k;N,r,z)}{f(k;N,r,z)} f(k;N,p,z)$$

$$< \frac{H(0;N,r,z)}{f(k;N,r,z)} f(k;N,p,z)$$

$$= \frac{f(k;N,p,z)}{f(k;N,r,z)};$$

where the second relation is true because $$\frac{H(k;N,p,z)}{f(k;N,p,z)} < \frac{H(k;N,r,z)}{f(k;N,r,z)}$$

and the third relation is true since $H(x;N,r,z)$ is a probability distribution.

This yields a substantial computational advantage over calculating the full hypergeometric tail, nevertheless calculation of factorial functions are time consuming and numerically unstable for large arguments. Therefore, an upper bound on the logarithm of the Hypergeometric tail is presented, which greatly reduces the computational burden.

An asymptotic series of a function $f(x)$ is a series expansion such that for every fixed positive integer n, $$\lim_{x \to \infty} f(x) - \left(a_U + \frac{a_1}{x} + \frac{a_2}{x} + \dots + \frac{a_n}{x^n}\right) = 0.$$

Asymptotic expansions need not converge to a finite value and taking more terms in the series does not necessarily increase the accuracy. The asymptotic expansion necessary for this work is the Stirling-De Moivre asymptotic expansion of the log-Gamma function $\Gamma(x)$ given by $$\ln\Gamma(x+1) = (x+1/2)\ln(x) - x + 1/2\ln(2\pi) + \frac{1}{12x} - \frac{1}{360x^3} + \frac{1}{1260x^5} - \dots$$

An asymptotic result to the upper bound is derived by the following, where $G(r,p)$ is the asymptotic ratio bound. Suppose $r=k/z$, $p=W/N$, and $p<r$. $h_U(x)$ and $h_L(x)$ are defined as follows:

$$h_U(x) = (x+1/2)\ln(x) - x + \frac{1}{12x}$$

$$h_L(x) = (x+1/2)\ln(x) - x + \frac{1}{12x} - \frac{1}{360x^3}$$

The function $$G(r,p) = h_U(N_p) + h_U((N-z)r) + h_U(N(1-p)) + h_U((N-z)(1-r)) (2 - h_L(N_r) - h_L(N_p - zr) - h_L(N(1-r)) - h_L(N(1-p) - z(1-r)))$$

bounds the logarithm of the tail of the hypergeometric distribution $H(k;N,p,z)$. In other words, $\ln(H(k;N,p,z)) \leq G(r,p)$.

The natural logarithm is a continuous monotonically increasing function, therefore, $$\ln(H(k;N,p,z)) \leq \ln\left(\frac{\binom{Np}{zr}\binom{N(1-p)}{z(1-r)}}{\binom{Nr}{zr}\binom{N(1-r)}{z(1-r)}}\right).$$

Stirling's approximation implies that the natural logarithm of the factorial function is bounded from above by $$\ln(\Gamma(x+1)) \geq (x+1/2)\ln(x) - x + \frac{1}{12x} - \frac{1}{360x^3} + 1/2\ln(2\pi)$$

$$= h_U(x) + 1/2\ln(2\pi),$$

and is bounded from below by $$\ln(\Gamma(x+1)) \geq (x+1/2)\ln(x) - x + \frac{1}{12x} - \frac{1}{360x^3} + 1/2\ln(2\pi)$$

$$= h_L(x) + 1/2\ln(2\pi).$$

An established value to assist with comparison of the number of false alarms is designated as ϵ. The established value, ϵ, is often chosen to be a predetermined value of one, but can be set to any number. In step 110, the number of false alarms for the node is compared with the predetermined value. The comparison determines whether or not the number of false alarms is less than ϵ. After the comparison, the selected node I is labeled as either being meaningful or not meaningful. The selected node is labeled as not meaningful when the calculated number of false alarms for the selected node I is not less than ϵ (step 112). The selected node is labeled as meaningful when the calculated number of false alarms for the node is less than ϵ (step 114).

The NFA from one group is compared to multiple groups of random variables. This is called the indivisibility condition. Treating a multiple set case different from a single set case is difficult because of the computational complexity of searching every possible multiple set decomposition of the image.

Instead of performing such a search, the FLST tree structure is utilized to obtain an enhanced computational advantage.

The indivisibility condition is a resolution of conflicting events. Suppose set B and C are contained in set A. When all three events are meaningful, a natural question arises: is the set A more meaningful, or is the event of B and C more meaningful? The indivisibility condition tests this event by bounding the number of false alarms for the joint occurrence of the even B and C.

The meaningful extension to multiple sets is understood by establishing some notation. Bold face letters such as x, denote q-tuples. The 1-norm of a non-negative q-tuple w is denoted as $|w|=w_1+w_2+\ldots w_q$. Subscript on bold face letters such as $w_r$ denotes the projection of the q-tuple onto the first r coordinates. The addition and multiplication operators of q-tuples represent component wise operations. For example, let x and y be two q-tuples, then $xy=(x_1y_1, x_2y_2, \ldots, x_qy_q)$. Furthermore, the shorthand $\{I_i \in R | i=1, 2, \ldots, q; I_i \cap I_j = \emptyset \text{ if } i \neq j\} = \{I_i\}_{i=1}^q$ is used to simplify notation. Also, to limit confusion, the family of sets $\{I_i\}_{i=1}^q$ is called a q-family of disjoint sets whenever q is a fixed number. In other words, all q-families of disjoint sets consist of exactly q mutually disjoint non-empty sets.

The multinomial coefficients are essential to the following. Multinomial coefficients are defined as $$\binom{N}{k} = \frac{N!}{k_1! k_2! \ldots k_q! (N-|k|)!}.$$

The multinomial coefficients represent the number of ways a population with N elements can be partitioned into q sub-populations of size $k_1, k_2, \ldots, k_q$.

Suppose there are N pixels with W white pixels and N-W black pixels. Consider a 2-family of disjoint sets $\{I_1 I_2\}$ with the first sample containing $n_1$ pixels and the second sample containing $n_2$ pixels and suppose there are $k_1$ white pixels in the first sample and $k_2$ white pixels in the second sample. Consider the following two stage event. First, $z_1+z_2$ pixels are drawn with $k_1+k_2$ white pixels. The pixels are then decomposed into two sets with $z_1$ pixels in the first set and $z_2$ pixels in the second set. Furthermore, there are observed to be $k_1$ white pixels in the first set and $k_2$ white pixels in the second set. This compound event is the product of two sampling without replacement events; thus the probability of this event is given by $$f_2(k; N, W, z) = \frac{\binom{W}{k_1+k_2}\binom{N-W}{z_1+z_2-k_1-k_2}}{\binom{N}{z_1+z_2}}$$

$$\frac{\binom{k_1+k_2}{k_1}\binom{z_1+z_2-k_1-k_2}{z_1-k_1}}{\binom{z_1+z_2}{z_1}}$$

$$= \frac{\binom{W}{k}\binom{N-W}{z-k}}{\binom{N}{z}},$$

where the easily derivable binomial coefficient relationship $$\binom{W}{\alpha_1+\alpha_2}\binom{\alpha_1+\alpha_2}{\alpha_1} = \binom{W}{a}$$

was used repeatedly. The tail of this distribution is $$H_2(k; N, W, z) = \sum_{j_1=k_1}^{z_1} \sum_{j_2=k_2}^{z_2} \frac{\binom{W}{j}\binom{N-W}{z-j}}{\binom{N}{z}}.$$

In general, given a q-family of disjoint sets $\{I_i\}_{i=1}^q$, the probability, $H_q(k;N,W,z)$, that at least $k_1$ out of $z_1$ are white in the first set, $k_2$ out of $z_2$ are white in the second set, etc., is given by $$H_q(k; N, W, z) = \sum_{j_1=k_1}^{z_1} \ldots \sum_{j_q=k_q}^{z_q} \frac{\binom{W}{j}\binom{N-W}{z-j}}{\binom{N}{z}}.$$

The subscript q on the function $H_q(k;N,W,z)$ indicates the number of disjoint sets considered.

The NFA function to q-family of disjoint sets is extended by letting $\{I_i\}_{i=1}^q$ be a q-family of disjoint sets, p=W/N, and $k(I_i)$ be the observed number of white pixels in set $I_i$ and $z(I_i)$ the total number of pixels in $I_i$. Suppose $$r = \left(\frac{k(I_1)}{z(I_1)}, \frac{k(I_2)}{z(I_2)}, \ldots, \frac{k(I_q)}{z(I_q)}\right)$$

then the number of false alarms of $\{I_i\}_{i=1}^q$ is $$NFA(\{I_i\}_{i=1}^q) = (M+1)^{q-1}\binom{|R|}{q} H_q(k; N, W, z).$$

This definition leads directly to the notion of $\epsilon$-meaningful sets.

The q-family $\{I_i\}_{i=1}^q$ is an $\epsilon$-meaningful q-family of disjoint sets when and only when p<r, for each i and NFA $(\{I_i\}_{i=1}^q) < \epsilon$. The definition of an $\epsilon$-meaningful q-family of disjoint sets is also a bound on the expected number of false alarms due to the a-contrario data model.

The expected number of $\epsilon$-meaningful q-family of disjoint sets is less than or equal to $\epsilon$. For $q \geq 2$, the multinomial coefficients can be written as $$\binom{W}{k} = \binom{W}{|k|}\prod_{i=1}^{q-1}\binom{|k_{i+1}|}{|k_i|}.$$

This is proven by induction on the length of the q-tuple k. Consider the case q=2. Then, $$\binom{W}{(k_1, k_2)} = \binom{W}{k}\binom{k_1 + k_2}{k_1}.$$

Assume $$\binom{W}{k} = \binom{W}{|k|}\prod_{i=1}^{q-1}\binom{|k_{i+1}|}{|k_i|}$$

holds for a q−1 tuple k. Let k be a q tuple, then by induction hypothesis, $$\binom{W}{k} = \frac{W!}{(W-|k|)!k_1!\ldots k_q!k_{q+1}!} = \binom{W}{|k|}\binom{|k|}{k_{q-1}} = \binom{W}{|k|}\prod_{i=1}^{q-1}\binom{|k_{i+1}|}{|k_i|}.$$

where the last equality is true by the induction hypothesis.

The computational burden of calculating $H_q(k;N,W,z)$ is unreasonably high, therefore and upper bound is given. This upper bound is proven below. Define $$H_q(k; N, p, z) - \sum_{j_1=k_1}^{z_1}\ldots\sum_{j_q=k_q}^{z_q}\frac{\binom{Np}{j}\binom{N(1-p!)}{z-j}}{\binom{N}{z}},$$

$$f_q(k; N, p, z) = \frac{\binom{Np}{k}\binom{N(1-p)}{z-k}}{\binom{N}{z}}$$

for p∈(0,1). The definition of the generalized binomial coefficients implies that the functions $H_q(k;N,p,z)$ and $f_q(k;N,p,z)$ are well defined.

Let p,r∈(0,1) with p<r. The ordering relationship $$\frac{H_q(k; N, p, z)}{f_q(k; N, p, z)} < \frac{H_q(k; N, r, z)}{f_q(k; N, r, z)}$$

holds. The representation of the multinomial coefficients gives $$\frac{H_q(k; N, p, z)}{f_q(k; N, p, z)} = \sum_{j_1=k_1}^{z_1}\ldots$$

$$\sum_{j_q=k_q}^{z_q}\left[\frac{\binom{Np}{|j|}\prod_{i=1}^{q-1}\binom{|j_{i+1}|}{|j_i|}}{\binom{Np}{|k|}\prod_{i=1}^{q-1}\binom{|k_{i+1}|}{|k_i|}}\right]\left[\frac{\binom{N(1-p)}{|z|-|j|}\prod_{i=1}^{q-1}\binom{|z_i+1|-|j_{i+1}|}{|z_i|-|j_i|}}{\binom{N(1-p)}{|z|-|k|}\prod_{i=1}^{q-1}\binom{|z_{i+1}|-|k_{i+1}|}{|z_i|-|k_i|}}\right] =$$

$$\sum_{j_1=k_1}^{z_1}\ldots\sum_{j_q=k_q}^{z_q}\left[\frac{\binom{Np}{|j|}\binom{N(1-p)}{|z|-|j|}}{\binom{Np}{|k|}\binom{N(1-p)}{|z|-|k|}}\right]\times$$

$$\left[\frac{\prod_{i=1}^{q-1}\binom{|j_{i+1}|}{|j_i|}\prod_{i=1}^{q-1}\binom{|k_{i+1}|}{|k_i|}}{\prod_{i=1}^{q-1}\binom{|z_{i+1}|-|j_{i+1}|}{|z_i|-|j_i|}\prod_{i=1}^{q-1}\binom{|z_{i+1}|-|k_{i+1}|}{|z_i|-|k_i|}}\right]$$

This implies that the above function is an increasing function of p.

Suppose $$r = \frac{\sum_{i=1}^{q}k(I_i)}{\sum_{i=1}^{q}z(I_i)}, r = \left(\frac{k(I_i)}{z(I_i)},\ldots,\frac{k(I_i)}{z(I_i)}\right)$$

and p<r, then the function $H_q(k;p,z)$ satisfies $$H_q(k; N, p, z) \leq \frac{\binom{Np}{zr}\binom{N(1-p)}{z(1-r)}}{\binom{Nr}{zr}\binom{N(1-r)}{z(1-r)}}.$$

For completeness, the logarithm of the tail of the hyergeometric distribution $H_q(k;N,p,z)$ is shown to be bounded by the following. Let p=W/N, and suppose $z(I_i)=|I_i|$ are the number of elements in the set $I_i$ and $k(I_i)$ are the observed number of white pixels in the set $I_i$. Then z and r are defined as $$z = \sum_{i=1}^{q}z(I_i),$$

$$r = \frac{\sum_{i=1}^{q}k(I_i)}{z},$$

and assume that p<r. Then define the function $G(r,p) = h_L(Np) + h_L((N-z)r) + h_L(N(1-p)) + h_L((N-z)(1-r)) - h_L(Nr) - h_L(Np-zr) - h_L(N(1-r)) - h_L(N(1-p)-z(1-r))$.

Then, the logarithm of the tail of the hypergeometric distribution $H_q(k;N,p,z)$ is bounded by $\ln(H_q(k;N,p,z)) \leq G(r,p)$.

Relative entropy of the selected node is designated as $H_q(\{G_i\}_{i=1}^{q})$, where $\{G_i\}_{i=1}^{q}$ represents children of the selected node. The relative entropy is calculated (step 108). The calculation of logarithms can be an order of magnitude more time consuming than simple multiplication, therefore algebraic tests that compare q-state relative entropy functions are important for fast calculations of ϵ-meaningful modes.

All remaining nodes are checked to determine whether or not they are meaningful. This determination is step 116. Step 116 iterates through the previous steps until all nodes are checked. The iteration includes 1) the selecting a node from a set of nodes $\{I_1 \ldots I_n\}$ step. 2) calculating the number of white pixels in a region corresponding to the node step, 3) calculating the number of false alarms for the selected node step, 4) storing the number of false alarms for the selected node step, 5) calculating relative entropy, $H_q(\{G_i\}_{i=1}^q)$, of the selected node, where $\{G_i\}_{i=1}^q$ are children of the selected node step, 6) labeling the selected node as meaningful when the calculated number of false alarms for the selected node is less than a predetermined value $\epsilon$ step, and 7) labeling the selected node as not meaningful when the calculated number of false alarms for the selected node is not less than the predetermined value $\epsilon$ step, until each node in the set of nodes $I_1 \ldots I_n$ has been labeled either meaningful or not meaningful.

Steps 118 through 132 further refine the determination of meaningful nodes by testing the indivisibility condition for each $\epsilon$-meaningful node. In step 118, a first meaningful node from the set of nodes $\{I_1 \ldots I_n\}$ is chosen. A family of sibling descendants is the set of children of a node, and let $\{G_i\}_{i=1}^q$ represents the family of sibling descendants of the selected node (step 120). In step 122, the number of false alarms for the family of sibling descendants, $\{G_i\}_{i=1}^q$, of the selected node is calculated and stored in an electronic storage device. The number of false alarms for the family of sibling descendants is designated as NFA(G).

In step 124, the number of false alarms for the family of sibling descendants, NFA(G), is compared with the number of false alarms for the node I, NFA(I). The comparison determines whether or not the number of false alarms for the family of sibling descendants is less than or equal to the number of false alarms for the node I. After the comparison, the selected node I is labeled as either being meaningful or not meaningful. The selected node is labeled as not meaningful when the calculated number of false alarms for the family of sibling descendants, $\{G_i\}_{i=1}^q$, of the selected node is less than or equal to the number of false alarms for the selected node (step 126). The selected node is labeled as meaningful when the calculated number of false alarms for the family of sibling descendants, $\{G_i\}_{i=1}^q$, of the selected node is not less than or equal to the number of false alarms for the selected node (step 128).

All remaining nodes are checked to determine whether or not they are meaningful. This determination is step 130. If other meaningful nodes have not been checked, step 132 is executed which iterates through the previous steps until all nodes are checked. The iteration includes 1) the selecting a meaningful node from a set of nodes $\{I_1 \ldots I_n\}$ step, 2) the determining a family of sibling descendants, $\{G_i\}_{i=1}^q$, of the selected node step, 3) the calculating a number of false alarms for the family of sibling descendants, $\{G_i\}_{i=1}^q$, of the selected node step, 4) the storing the number of false alarms for the family of sibling descendants, $\{G_i\}_{i=1}^q$, of the selected node step, 5) the labeling the selected node as not meaningful when the calculated number of false alarms for the family of sibling descendants, $\{G_i\}_{i=1}^q$, of the selected node is less than or equal to the number of false alarms for the selected node step, 6) the labeling the selected node as meaningful when the calculated number of false alarms for the family of sibling descendants, $\{G_i\}_{i=1}^q$, of the selected node is not less than or equal to the number of false alarms for the selected node step, until each node in the set of nodes $\{I_1 \ldots I_n\}$ has been labeled either meaningful or not meaningful.

After all the meaningful nodes have been checked, nodes that are still categorized as meaningful are labeled as the set $\{J_1 \ldots J_n\}$. Steps 134 through 146 confirm if any $\epsilon$-meaningful sets include a set with a lower number of false alarms. In step 134, a meaningful node from a set of meaningful nodes $\{J_1 \ldots J_n\}$ is selected. Individual descendants, G, of the selected meaningful node are determined (step 136).

In step 140, the number of false alarms for the descendants, NFA(G), of the selected meaningful node are calculated and compared with the number of false alarms for the node J, NFA(J). The comparison determines whether or not the number of false alarms for the descendant is less than the number of false alarms for the node J. After the comparison, the selected node J is labeled as either being a dominant ancestor or not a dominant ancestor. The selected meaningful node J is labeled as a dominant ancestor when the calculated number of false alarms for the descendants, G, of the selected node is not less than the number of false alarms for the selected node (step 142). Conversely, the selected meaningful node is labeled as not a dominant ancestor when the calculated number of false alarms for the descendants, G, of the selected node is less than the number of false alarms for the selected node (step 144).

All remaining meaningful nodes are checked to determine whether or not they are dominant ancestors. This determination is step 146. When other meaningful nodes have not been checked steps 134 through 146 are iterated through until all meaningful nodes have been checked. The iteration includes 1) the selecting a meaningful node from a set of meaningful nodes $\{J_1 \ldots J_n\}$ step, 2) the determining individual descendants, G, of the selected meaningful node step, 3) the calculating a number of false alarms for the descendants, G, of the selected meaningful node step, 4) the labeling the selected meaningful node as not a dominant ancestor when the calculated number of false alarms for the descendants, G, of the selected meaningful node is less than said number of false alarms for the selected meaningful node step, 5) the labeling the selected meaningful node as a dominant ancestor when the calculated number of false alarms for the descendants, G, of the selected meaningful node is not less than the number of false alarms for the selected meaningful node step, until each node in the set of nodes $\{J_1 \ldots J_n\}$ has been labeled either a dominant ancestor or not a dominant ancestor.

Steps 148 through 156 designate the maximal meaningful nodes in conjunction with outputting the maximal meaningful nodes (step 36) in a tangible medium by verifying that each indivisible $\epsilon$-meaningful node is not contained in another $\epsilon$-meaningful node that is both indivisible and a dominant ancestor. Nodes that are categorized as meaningful and dominant ancestors are labeled as $\{K_1 \ldots K_n\}$.

In step 148, the first meaningful and dominant ancestor node is selected from a set of meaningful and dominant ancestor nodes $\{K_1 \ldots K_n\}$. Ascendant nodes, G, of the selected meaningful and dominant ancestor node are determined (step 149), where an ascendant node is any node that lies on the shortest connected path between the chosen node and the root 22 of the containment tree structure 20.

In step 150, the number of false alarms for each ascendant node G, NFA(G), is calculated and compared with the number of false alarms for the node K, NFA(K). The comparison determines whether or not the number of false alarms for the ascendant node is less than or equal to the number of false alarms for the node K. After the comparison, the selected node K is labeled as either being a maximal meaningful node or not a maximal meaningful node.

In step 152, the selected meaningful and dominant ancestor node K is labeled as not maximal meaningful when the calculated number of false alarms for the ascendant node, G, of the selected meaningful and dominant ancestor node is less than or equal to the number of false alarms for the selected meaningful and dominant ancestor node. Conversely, in step 154, the selected meaningful and dominant ancestor node K is labeled as maximal meaningful when the calculated number of false alarms for the ascendant node, G, of the selected meaningful and dominant ancestor node is not less than or equal to the number of false alarms for the selected meaningful and dominant node.

All remaining meaningful and dominant ascendant nodes are checked to determine whether or not they are maximal meaningful. This determination is step 156. When other meaningful and dominant ancestor nodes have not been checked, step 158 is executed which changes to the next meaningful and dominant ancestor node and iterates through the previous steps (steps 148 through 156) until all meaningful and dominant ancestor nodes are checked.

The iteration includes 1) iterating through said selecting a meaningful and dominant ancestor node from a set of meaningful and dominant ancestor nodes $\{K_1 \ldots K_n\}$ step, 2) determining individual ascendants, G, of the selected meaningful and dominant ancestor node step, 3) the calculating a number of false alarms for the ascendants, G, of the selected meaningful and dominant ancestor node step, 4) the labeling the selected meaningful and dominant ancestor node as not maximal meaningful when the calculated number of false alarms for the ascendants, G, of the selected meaningful and dominant ancestor node is less than or equal to said number of false alarms for the selected meaningful and dominant ancestor node step, 5) the labeling the selected meaningful and dominant ancestor node as maximal meaningful when the calculated number of false alarms for the ascendants, G, of the selected meaningful and dominant ancestor node is not less than or equal to said number of false alarms for the selected meaningful and dominant node step, until each meaningful and dominant ancestor node in the set of meaningful and dominant ancestor nodes $\{K_1 \ldots K_n\}$ has been labeled either maximal meaningful or not maximal meaningful. Step 36 outputs the maximal meaningful nodes in a tangible medium.

Another embodiment of the invention includes a level set tree feature detection machine including at least one instruction that, when executed by a computer, causes the computer to generate a fast level set tree transform of at least one pixilated image. One pixilated image is used for histogram analysis. Two pixilated images are used for change detection analysis. Three pixilated images are used for coherent motion analysis.

At least one instruction that, when executed by a computer, causes the computer to identify the W pixels having the W largest value of a predetermined feature of interest. W is between about five and ninety-fifty percent of the total number of pixels of the pixilated images. The feature of interest is normal residue motion.

At least one instruction that, when executed by a computer, causes the computer to create a binary map of the pixilated images. Each of the W pixels is assigned a binary value of one. At least one instruction that, when executed by a computer, causes the computer to calculate node values based on statistical differences amongst the pixilated images.

At least one instruction that, when executed by a computer, causes the computer to select a node from a set of nodes $\{I_1 \ldots I_n\}$. At least one instruction that, when executed by a computer, causes the computer to calculate the number of white pixels in a region corresponding to the selected node. At least one instruction that, when executed by a computer, causes the computer to calculate a number of false alarms for the selected node.

At least one instruction that, when executed by a computer, causes the computer to store the number of false alarms for the selected node in an electronic storage device. Additionally, at least one instruction, when executed by a computer, causes the computer to calculate relative entropy, $H_q(\{G_i\}_{i=1}^q)$, of the selected node. $\{G_i\}_{i=1}^q$ represents children of the selected node.

At least one instruction that, when executed by a computer, causes the computer to label the selected node as meaningful when the calculated number of false alarms for the selected node is less than a predetermined value $\epsilon$. Conversely, at least one instruction that, when executed by a computer, causes the computer to label the selected node as not meaningful when the calculated number of false alarms for the selected node is not less than the predetermined value $\epsilon$.

At least one instruction that, when executed by a computer, causes the computer to iterate through 1) the selecting a node from a set of nodes $\{I_1 \ldots I_n\}$ instruction, 2) the calculating the number of white pixels in a region corresponding to the node instruction, 3) the calculating a number of false alarms for the selected node instruction, 4) the storing the number of false alarms for the selected node instruction, 5) the calculating relative entropy, $H_q(\{G_i\}_{i=1}^q)$, of the selected node where $\{G_i\}_{i=1}^q$ are children of the selected node instruction, 6) the labeling the selected node as meaningful when the calculated number of false alarms for the selected node is less than a predetermined value $\epsilon$ instruction, and 7) the labeling the selected node as not meaningful when the calculated number of false alarms for the selected node is not less than the predetermined value $\epsilon$ instruction, until each node in the set of nodes $I_1 \ldots I_n$ has been labeled either meaningful or not meaningful.

At least one instruction that, when executed by a computer, causes the computer to select a meaningful node from a set of nodes $\{I_1 \ldots I_n\}$. At least one instruction that, when executed by a computer, causes the computer to determine a family of sibling descendants, $\{G_i\}_{i=1}^q$, of the selected node. At least one instruction that, when executed by a computer, causes the computer to calculate a number of false alarms for the family of sibling descendants, $\{G_i\}_{i=1}^q$, of the selected node.

At least one instruction that, when executed by a computer, causes the computer to store the number of false alarms for the family of sibling descendants, $\{G_i\}_{i=1}^q$, of the selected node in an electronic storage device. At least one instruction that, when executed by a computer, causes the computer to label the selected node as not meaningful when the calculated number of false alarms for the family of sibling descendants, $\{G_i\}_{i=1}^q$, of the selected node is less than or equal to the number of false alarms for the selected node. Conversely, at least one instruction that, when executed by a computer, causes the computer to label the selected node as meaningful when the calculated number of false alarms for the family of sibling descendants, $\{G_i\}_{i=1}^q$, of the selected node is not less than or equal to the number of false alarms for the selected node.

At least one instruction that, when executed by a computer, causes the computer to iterate through 1) the selecting a meaningful node from a set of nodes $\{I_1 \ldots I_n\}$ instruction, 2) the determining a family of sibling descendants, $\{G_i\}_{i=1}^q$, of the selected node instruction, 3) the calculating a number of false alarms for the family of sibling descendants, $\{G_i\}_{i=1}^q$, of the selected node instruction, 4) the storing the number of false alarms for the family of sibling descendants, $\{G_i\}_{i=1}^q$, of the selected node instruction, 5) the labeling the selected node as not meaningful when the calculated number of false alarms for the family of sibling descendants, $\{G_i\}_{i=1}^q$, of the selected node is less than or equal to the number of false alarms for the selected node instruction, 6) the labeling the selected node as meaningful when the calculated number of false alarms for the family of sibling descendants, $\{G_i\}_{i=1}^q$, of the selected node is not less than or equal to the number of false alarms for the selected node instruction, until each node in the set of nodes $\{I_1 \ldots I_n\}$ has been labeled either meaningful or not meaningful.

At least one instruction that, when executed by a computer, causes the computer to select a meaningful node from a set of meaningful nodes $\{J_1 \ldots J_n\}$. At least one instruction that, when executed by a computer, causes the computer to determine individual descendants, G, of the selected meaningful node. At least one instruction that, when executed by a computer, causes the computer to calculate a number of false alarms for the descendants, G, of the selected meaningful node.

At least one instruction that, when executed by a computer, causes the computer to label the selected meaningful node as not a dominant ancestor when the calculated number of false alarms for the descendants, G, of the selected node is less than the number of false alarms for the selected meaningful node. Conversely, at least one instruction that, when executed by a computer, causes the computer to label the selected meaningful node as a dominant ancestor when the calculated number of false alarms for the descendants, G, of the selected meaningful node is not less than the number of false alarms for the selected meaningful node.

At least one instruction that, when executed by a computer, causes the computer to iterate through 1) the selecting a meaningful node from a set of meaningful nodes $\{J_1 \ldots J_n\}$ instruction, 2) the determining individual descendants, G, of the selected meaningful node instruction, 3) the calculating a number of false alarms for the descendants, G, of the selected meaningful node instruction, 4) the labeling the selected meaningful node as not a dominant ancestor when the calculated number of false alarms for the descendants, G, of the selected meaningful node is less than the number of false alarms for the selected meaningful node instruction, 5) the labeling the selected meaningful node as a dominant ancestor when the calculated number of false alarms for the descendants, G, of the selected meaningful node is not less than the number of false alarms for the selected meaningful node instruction, until each meaningful node in the set of meaningful nodes $\{J_1 \ldots J_n\}$ has been labeled either a dominant ancestor or not a dominant ancestor.

At least one instruction that, when executed by a computer, causes the computer to select a meaningful and dominant ancestor node from a set of meaningful and dominant ancestor nodes $\{K_1 \ldots K_n\}$. At least one instruction that, when executed by a computer, causes the computer to determine individual ascendants, G, of the selected meaningful and dominant ancestor node. At least one instruction that, when executed by a computer, causes the computer to calculate a number of false alarms for the ascendants, G, of the selected meaningful and dominant ancestor node.

At least one instruction that, when executed by a computer, causes the computer to label the selected meaningful and dominant ancestor node as not maximal meaningful when the calculated number of false alarms for the ascendants, G, of the selected meaningful and dominant ancestor node is less than or equal to the number of false alarms for the selected meaningful and dominant ancestor node. Conversely, at least one instruction that, when executed by a computer, causes the computer to label the selected meaningful and dominant ancestor node as maximal meaningful when the calculated number of false alarms for the ascendants, G, of the selected meaningful and dominant ancestor node is not less than or equal to the number of false alarms for the selected meaningful and dominant node.

At least one instruction that, when executed by a computer, causes the computer to iterate through 1) the selecting a meaningful and dominant ancestor node from a set of meaningful and dominant ancestor nodes $\{K_1 \ldots K_n\}$ instruction, 2) the determining individual ascendants, G, of the selected meaningful and dominant ancestor node instruction, 3) the calculating a number of false alarms for the ascendants, G, of the selected meaningful and dominant ancestor node instruction, 4) the labeling the selected meaningful and dominant ancestor node as not maximal meaningful when the calculated number of false alarms for the ascendants, G, of the selected meaningful and dominant ancestor node is less than or equal to the number of false alarms for the selected meaningful and dominant ancestor node instruction, 5) the labeling the selected meaningful and dominant ancestor node as maximal meaningful when the calculated number of false alarms for the ascendants, G, of the selected meaningful and dominant ancestor node is not less than or equal to the number of false alarms for the selected meaningful and dominant node instruction, until each meaningful and dominant ancestor node in the set of meaningful and dominant ancestor nodes $\{K_1 \ldots K_n\}$ has been labeled either maximal meaningful or not maximal meaningful.

A readable storage device has computer readable program code stored thereon, wherein the computer readable program code includes computer executable instructions. At least one instruction that, when executed by a computer, causes the computer to output in a tangible medium the maximal meaningful nodes.

Another embodiment of the invention includes a level set tree feature detection machine including a device that electronically generates a binary map of pixilated images and a device that determines maximal meaningful nodes of the pixilated images. The level set tree feature detection machine also includes a device that outputs maximal meaningful nodes in a tangible medium. Additionally, the output includes pixel locations of a set of nodes and the number of false alarm values.

The device that determines maximal meaningful nodes is a device that further determines node values based on statistical differences amongst the pixilated images. The device that determines node values based on the statistical differences amongst the pixilated images further determines dominant ancestors of the meaningful nodes.

The binary map generation, maximal meaningful node determination, and other calculations associated with the machine are performed in the computer processor. Output from the machine includes hard copy printouts, other computer accessible medium such as computer hard drives or floppy discs, visual display screens, as well as other mediums employing identified target coordinates.

Working Example

Figure 6:
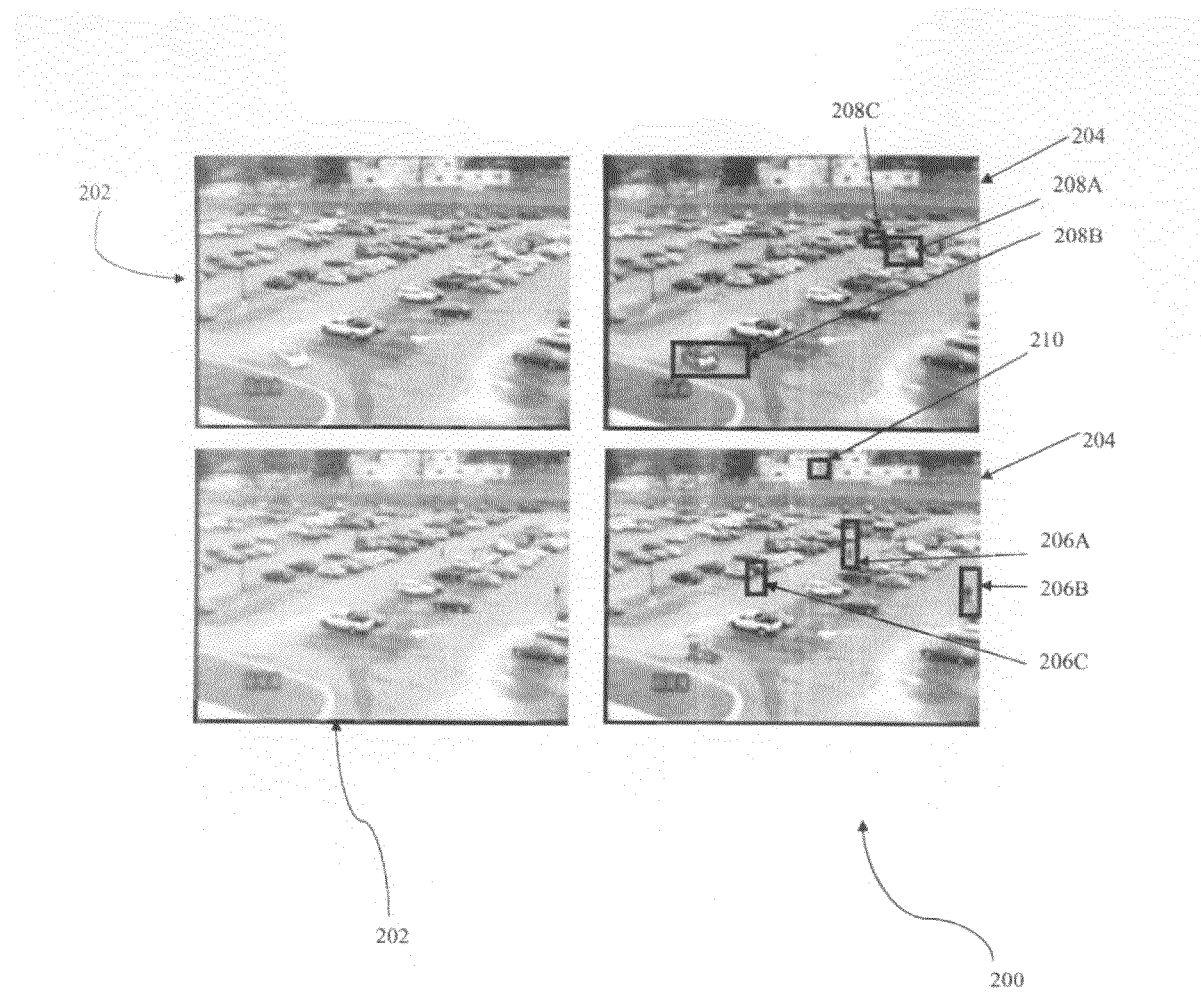
FIG. 6 illustrates a working example of change detection analysis using the level set tree feature detection, according to embodiments of the invention.

All working examples implement the same procedures discussed earlier. FIG. 6 presents a working example of change detection analysis 200 using the invention. A fixed camera is positioned overlooking a parking lot. The left hand images 202 are the original images. The right hand images 204 show the maximal meaningful level sets outlined in boxes for easier viewing. In practice, the maximal meaningful level sets may also be shown in color to assist the end user. Maximal meaningful level set designation is automatically output to the end user.

The parking lot scene has seven total changes. Three pedestrians 206A, 206B, and 206C are added. One pedestrian 206C is entering a row of cars. Three cars 208A, 208B, and 208C are removed. One of the removed cars 208C was leaving a row of cars. Furthermore, a light 210 is turned on in the background building.

Figure 7:
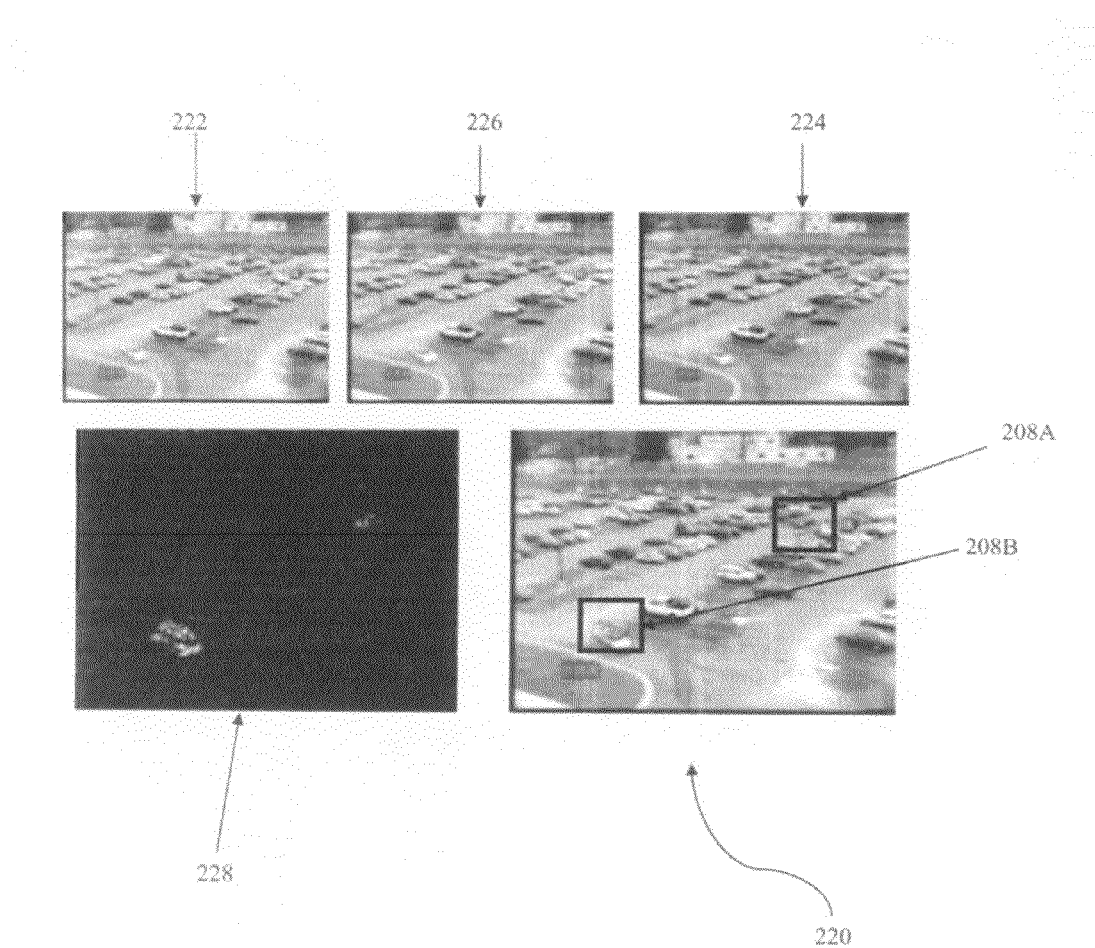
FIG. 7 illustrates a working example of coherent motion analysis using the level set tree feature detection, according to embodiments of the invention.

FIG. 7 presents a working example of coherent motion analysis 220 using the invention. The same parking lot and camera are used as in the previous example with change detection. In this working example, however, a top left 222 and top right 224 image are background images, while a top central 226 image is an input image. The top three images are used to obtain a lower left hand image 228.

The lower left hand image 228 shows the maximal meaningful sets corresponding to the two moving objects, which are the two moving cars (208A & 208B). Some shape information is obtained by using the level sets of the top 226 central image. The invention removes many of the spurious pixels distributed on the rest of the binary map shown in the lower left image 228. The two moving cars (208A & 208B) in a lower right image 230 are represented as concentrated white clusters in the lower left image 228.

Figure 8:
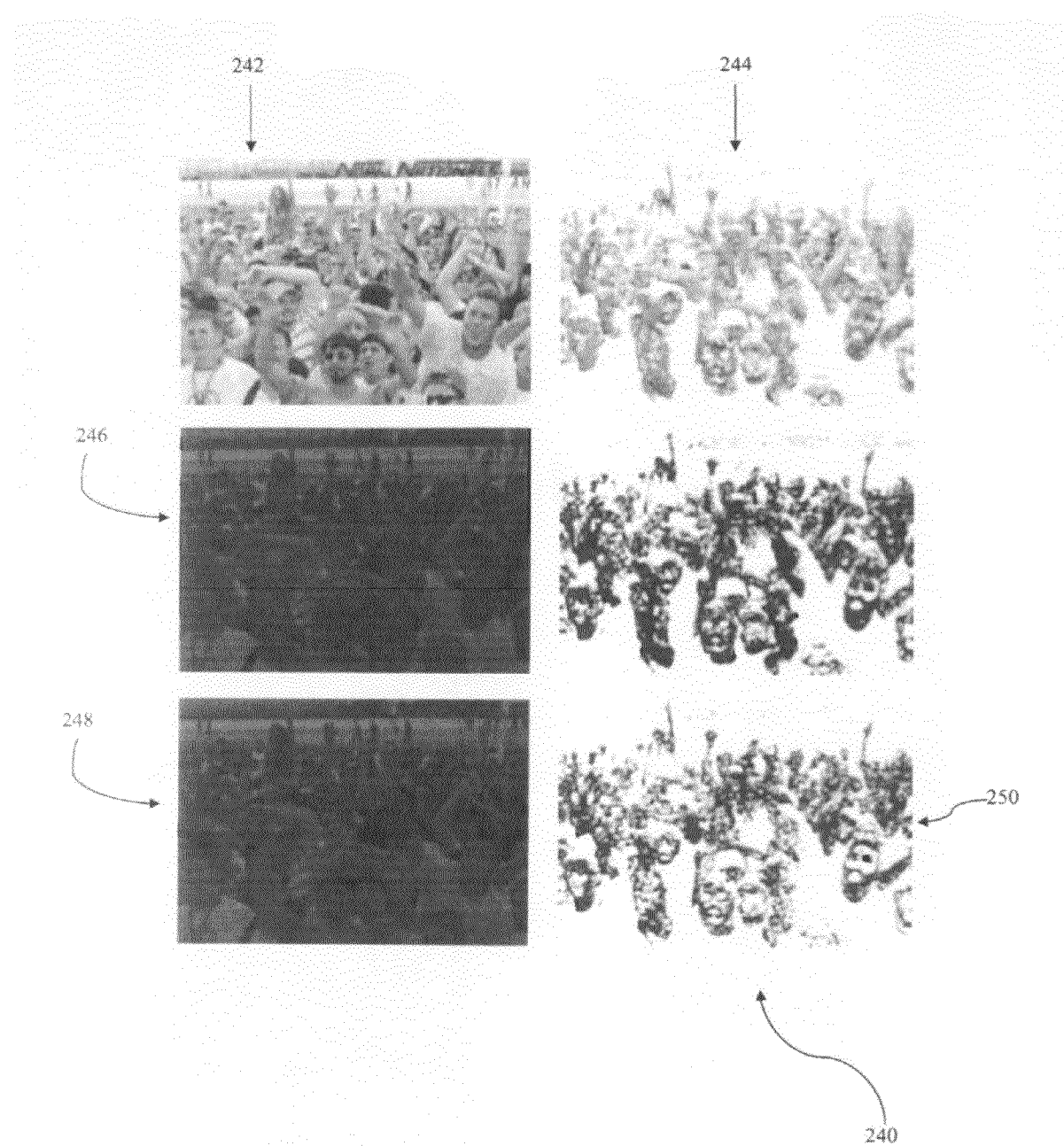
FIG. 8 illustrates a working example of histogram analysis using the level set tree feature detection, according to embodiments of the invention.

FIG. 8 presents a working example of histogram analysis 240 using the invention to demonstrate robustness under contrast change of a crowd image. A top left panel 242 is the original image and the mode with the least number of false alarms extracts skin tones as shown in a top right panel 244. The luminous value 1 is scaled down by a factor of four in a middle left panel 246, and the skin tones are still extracted. Images are typically stored in RGB format. The RGB values were all scaled down by a factor of four in a bottom left panel 248. The image was then transformed to the CIELAB color space, and slightly fewer skin tones were extracted as shown in a bottom right panel 250. The dominant skin tones were found. The next step in the research involves using the apparatus 30 with greater than three images.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for detecting a level set tree feature for measuring changes between images with a non-transitory computer-readable medium, comprising:
   providing at least two pixilated images;
   electronically generating a model of said at least two pixilated images;
   electronically determining maximal meaningful nodes from said model of said at least two pixilated images;
   wherein said determining maximal meaningful nodes of said at least two pixilated images, further comprises:
   selecting a node from a set of nodes $\{I_1 \ldots I_n\}$;
      calculating the number of white pixels in a region corresponding to said selected node;
      calculating a number of false alarms for said selected node;
         storing said number of false alarms for said selected node in an electronic storage device;
      calculating relative entropy, $H_q(\{G_i\}_{i=1}^q)$, of said selected node, wherein $\{G_i\}_{i=1}^q$ are children of said selected node;
         wherein labeling said selected node as meaningful when said calculated number of false alarms for said selected node is less than a predetermined value $\epsilon$; or
         wherein labeling said selected node as not meaningful when said calculated number of false alarms for said selected node is not less than said predetermined value $\epsilon$; and
   iterating through said selecting a node from a set of nodes $\{I_1 \ldots I_n\}$ step, said calculating the number of white pixels in a region corresponding to said node step, said calculating a number of false alarms for said selected node step, said storing said number of false alarms for said selected node step, said calculating relative entropy, $H_q(\{G_i\}_{i=1}^q)$, of said selected node wherein $\{G_i\}_{i=1}^q$ are children of said selected node step, said labeling said selected node as meaningful when said calculated number of false alarms for said selected node is less than a predetermined value $\epsilon$ step, and said labeling said selected node as not meaningful when said calculated number of false alarms for said selected node is not less than said predetermined value $\epsilon$ step, until each node in the set of nodes $\{I_1 \ldots I_n\}$ has been labeled either meaningful or not meaningful; and
   outputting in a tangible medium said maximal meaningful nodes.

2. The method of claim 1, further comprising generating a fast level set tree transform of said at least two pixilated images.

3. The method of claim 2, further comprises using said generated fast level set tree transform of said at least two pixilated images.

4. The method of claim 1, wherein the number of said at least two pixilated images is two.

5. The method of claim 1, wherein the number of said at least two pixilated images is three.

6. The method of claim 1, wherein said determining maximal meaningful nodes of said at least two pixilated images, further comprises:
   calculating node values based on statistical differences amongst said at least two pixilated images.

7. The method of claim 1, wherein said determining maximal meaningful nodes of said at least two pixilated images, further comprises:
   selecting a meaningful node from a set of nodes $\{I_1 \ldots I_n\}$;
      determining a family of sibling descendants, $\{G_i\}_{i=1}^q$, of said selected node;
      calculating a number of false alarms for said family of sibling descendants, $\{G_i\}_{i=1}^q$, of said selected node;
         storing said number of false alarms for said family of sibling descendants, $\{G_i\}_{i=1}^q$, of said selected node in an electronic storage device;
      wherein labeling said selected node as not meaningful when said calculated number of false alarms for said family of sibling descendants, $\{G_i\}_{i=1}^q$, of said selected node is less than or equal to said number of false alarms for said selected node; or
      wherein labeling said selected node as meaningful when said calculated number of false alarms for said family of sibling descendants, $\{G_i\}_{i=1}^q$, of said selected node is not less than or equal to said number of false alarms for said selected node; and
   iterating through said selecting a meaningful node from a set of nodes $\{I_1 \ldots I_n\}$ step, said determining a family of sibling descendants, $\{G_i\}_{i=1}^q$, of said selected node step, said calculating a number of false alarms for said family of sibling descendants, $\{G_i\}_{i=1}^q$, of said selected node step, said storing said number of false alarms for said family of sibling descendants, $\{G_i\}_{i=1}^q$, of said selected node step, said labeling said selected node as not meaningful when said calculated number of false alarms for said family of sibling descendants, $\{G_i\}_{i=1}^q$, of said selected node is less than or equal to said number of false alarms for said selected node step, said labeling said selected node as meaningful when said calculated number of false alarms for said family of sibling descendants, $\{G_i\}_{i=1}^q$, of said selected node is not less than or equal to said number of false alarms for said selected node step, until each node in the set of nodes $\{I_1 \ldots I_n\}$ has been labeled either meaningful or not meaningful.

8. The method of claim 7, wherein said determining maximal meaningful nodes of said at least two pixilated images, further comprises:
  selecting a meaningful node from a set of meaningful nodes $\{J_1 \ldots J_n\}$;
    determining individual descendants, G, of said selected meaningful node;
      calculating a number of false alarms for said descendants, G, of said selected meaningful node;
    wherein labeling said selected meaningful node as not a dominant ancestor when said calculated number of false alarms for said descendants, G, of said selected meaningful node is less than said number of false alarms for said selected node; or
    wherein labeling said selected meaningful node as a dominant ancestor when said calculated number of false alarms for said descendants, G, of said selected meaningful node is not less than said number of false alarms for said selected meaningful node; and
  iterating through said selecting a meaningful node from a set of meaningful nodes $\{J_1 \ldots J_n\}$ step, said determining individual descendants, G, of said selected meaningful node step, said calculating a number of false alarms for said descendants, G, of said selected meaningful node step, said labeling said selected meaningful node as not a dominant ancestor when said calculated number of false alarms for said descendants, G, of said selected meaningful node is less than said number of false alarms for said selected meaningful node step, said labeling said selected meaningful node as a dominant ancestor when said calculated number of false alarms for said descendants, G, of said selected meaningful node is not less than said number of false alarms for said selected meaningful node step, until each node in the set of nodes $\{J_1 \ldots J_n\}$ has been labeled either a dominant ancestor or not a dominant ancestor.

9. The method of claim 8, wherein said determining maximal meaningful nodes of said at least two pixilated images, further comprising:
  selecting a meaningful and dominant ancestor node from a set of meaningful and dominant nodes $\{K_1 \ldots K_n\}$;
    determining individual ascendants, G, of said selected meaningful and dominant ancestor node;
      calculating a number of false alarms for said ascendants, G, of said selected meaningful and dominant ancestor node;
    wherein labeling said selected meaningful and dominant ancestor node as not maximal meaningful when said calculated number of false alarms for said ascendants, G, of said selected meaningful and dominant ancestor node is less than or equal to said number of false alarms for said selected meaningful and dominant ancestor node; or
    wherein labeling said selected meaningful and dominant ancestor node as maximal meaningful when said calculated number of false alarms for said ascendants, G, of said selected meaningful and dominant ancestor node is not less than or equal to said number of false alarms for said selected meaningful and dominant ancestor node; and
  iterating through said selecting a meaningful and dominant ancestor node from a set of meaningful and dominant ancestor nodes $\{K_1 \ldots K_n\}$ step, said determining individual ascendants, G, of said selected meaningful and dominant ancestor node step, said calculating a number of false alarms for said ascendants, G, of said selected meaningful and dominant ancestor node step, said labeling said selected meaningful and dominant ancestor node as not maximal meaningful when said calculated number of false alarms for said ascendants, G, of said selected meaningful and dominant ancestor node is less than or equal to said number of false alarms for said selected meaningful and dominant ancestor node step, said labeling said selected meaningful and dominant ancestor node as maximal meaningful when said calculated number of false alarms for said ascendants, G, of said selected meaningful and dominant ancestor node is not less than or equal to said number of false alarms for said selected meaningful and dominant ancestor node step, until each meaningful and dominant ancestor node in the set of meaningful and dominant ancestor nodes $\{K_1 \ldots K_n\}$ has been labeled either maximal meaningful or not maximal meaningful.

10. A non-transitory computer-readable medium encoded for level set tree feature detection for measuring changes between images, comprising:
  at least one instruction that, when executed by a computer, causes said computer to generate a fast level set tree transform of at least two pixilated images;
  at least one instruction that, when executed by a computer, causes said computer to create a binary map of said at least two pixilated images;
  at least one instruction that, when executed by a computer, causes said computer to calculate node values based on statistical differences amongst said at least two pixilated images;
  at least one instruction that, when executed by a computer, causes said computer to select a node from a set of nodes $\{I_1 \ldots I_n\}$;
    at least one instruction that, when executed by a computer, causes said computer to calculate the number of white pixels in a region corresponding to said selected node;
    at least one instruction that, when executed by a computer, causes said computer to calculate a number of false alarms for said selected node;
      at least one instruction that, when executed by a computer, causes said computer to store said number of false alarms for said selected node in an electronic storage device;
  at least one instruction that, when executed by a computer, causes said computer to calculate relative entropy, $H_q(\{G_i\}_{i=1}^q)$, of said selected node, wherein $\{G_i\}_{i=1}^q$ are children of said selected node;
    wherein at least one instruction that, when executed by a computer, causes said computer to label said selected node as meaningful when said calculated number of false alarms for said selected node is less than a predetermined value $\epsilon$; or
    wherein at least one instruction that, when executed by a computer, causes said computer to label said selected node as not meaningful when said calculated number of false alarms for said selected node is not less than said predetermined value $\epsilon$;
  at least one instruction that, when executed by a computer, causes said computer to iterate through said selecting a node from a set of nodes $\{I_1 \ldots I_n\}$ instruction, said calculating the number of white pixels in a region corresponding to said node instruction, said calculating a number of false alarms for said selected node instruction, said storing said number of false alarms for said selected node instruction, said calculating relative entropy, $H_q(\{G_i\}_{i=1}^q)$, of said selected node wherein $\{G_i\}_{i=1}^q$ are children of said selected node instruction, said labeling said selected node as meaningful when said calculated number of false alarms for said selected node is less than a predetermined value $\epsilon$ instruction, and said labeling said selected node as not meaningful when said calculated number of false alarms for said selected node is not less than said predetermined value $\epsilon$ instruction, until each node in the set of nodes $I_1 \ldots I_n$ has been labeled either meaningful or not meaningful;

at least one instruction that, when executed by a computer, causes said computer to select a meaningful node from a set of nodes $\{I_1 \ldots I_n\}$;

at least one instruction that, when executed by a computer, causes said computer to determine a family of sibling descendants, $\{G_i\}_{i=1}^q$, of said selected node;

at least one instruction that, when executed by a computer, causes said computer to calculate a number of false alarms for said family of sibling descendants, $\{G_i\}_{i=1}^q$, of said selected node;

at least one instruction that, when executed by a computer, causes said computer to store said number of false alarms for said family of sibling descendants, $\{G_i\}_{i=1}^q$, of said selected node in an electronic storage device;

wherein at least one instruction that, when executed by a computer, causes said computer to label said selected node as not meaningful when said calculated number of false alarms for said family of sibling descendants, $\{G_i\}_{i=1}^q$, of said selected node is less than or equal to said number of false alarms for said selected node; or wherein at least one instruction that, when executed by a computer, causes said computer to label said selected node as meaningful when said calculated number of false alarms for said family of sibling descendants, $\{G_i\}_{i=1}^q$, of said selected node is not less than or equal to said number of false alarms for said selected node;

at least one instruction that, when executed by a computer, causes said computer to iterate through said selecting a meaningful node from a set of nodes $\{I_1 \ldots I_n\}$ instruction, said determining a family of sibling descendants, $\{G_i\}_{i=1}^q$, of said selected node instruction, said calculating a number of false alarms for said family of sibling descendants, $\{G_i\}_{i=1}^q$, of said selected node instruction, said storing said number of false alarms for said family of sibling descendants, $\{G_i\}_{i=1}^q$, of said selected node instruction, said labeling said selected node as not meaningful when said calculated number of false alarms for said family of sibling descendants, $\{G_i\}_{i=1}^q$, of said selected node is less than or equal to said number of false alarms for said selected node instruction, said labeling said selected node as meaningful when said calculated number of false alarms for said family of sibling descendants, $\{G_i\}_{i=1}^q$, of said selected node is not less than or equal to said number of false alarms for said selected node instruction, until each node in the set of nodes $\{I_1 \ldots I_n\}$ has been labeled either meaningful or not meaningful;

at least one instruction that, when executed by a computer, causes said computer to select a meaningful node from a set of meaningful nodes $\{J_1 \ldots J_n\}$;

at least one instruction that, when executed by a computer, causes said computer to determine individual descendants, G, of said selected meaningful node;

at least one instruction that, when executed by a computer, causes said computer to calculate a number of false alarms for said descendants, G, of said selected meaningful node;

wherein at least one instruction that, when executed by a computer, causes said computer to label said selected meaningful node as not a dominant ancestor when said calculated number of false alarms for said descendants, G, of said selected node is less than said number of false alarms for said selected meaningful node; or wherein at least one instruction that, when executed by a computer, causes said computer to label said selected meaningful node as a dominant ancestor when said calculated number of false alarms for said descendants, G, of said selected meaningful node is not less than said number of false alarms for said selected meaningful node;

at least one instruction that, when executed by a computer, causes said computer to iterate through said selecting a meaningful node from a set of meaningful nodes $\{J_1 \ldots J_n\}$ instruction, said determining individual descendants, G, of said selected meaningful node instruction, said calculating a number of false alarms for said descendants, G, of said selected meaningful node instruction, said labeling said selected meaningful node as not a dominant ancestor when said calculated number of false alarms for said descendants, G, of said selected meaningful node is less than said number of false alarms for said selected meaningful node instruction, said labeling said selected meaningful node as a dominant ancestor when said calculated number of false alarms for said descendants, G, of said selected meaningful node is not less than said number of false alarms for said selected meaningful node instruction, until each meaningful node in the set of meaningful nodes $\{J_1 \ldots J_n\}$ has been labeled either a dominant ancestor or not a dominant ancestor;

at least one instruction that, when executed by a computer, causes said computer to select a meaningful and dominant ancestor node from a set of meaningful and dominant ancestor nodes $\{K_1 \ldots K_n\}$;

at least one instruction that, when executed by a computer, causes said computer to determine individual ascendants, G, of said selected meaningful and dominant ancestor node;

at least one instruction that, when executed by a computer, causes said computer to calculate a number of false alarms for said ascendants, G, of said selected meaningful and dominant ancestor node;

wherein at least one instruction that, when executed by a computer, causes said computer to label said selected meaningful and dominant ancestor node as not maximal meaningful when said calculated number of false alarms for said ascendants, G, of said selected meaningful and dominant ancestor node is less than or equal to said number of false alarms for said selected meaningful and dominant ancestor node; or wherein at least one instruction that, when executed by a computer, causes said computer to label said selected meaningful and dominant ancestor node as maximal meaningful when said calculated number of false alarms for said ascendants, G, of said selected meaningful and dominant ancestor node is not less than or equal to said number of false alarms for said selected meaningful and dominant node;

at least one instruction that, when executed by a computer, causes said computer to iterate through said selecting a meaningful and dominant ancestor node from a set of meaningful and dominant ancestor nodes $\{K_1 \ldots K_n\}$ instruction, said determining individual ascendants, G, of said selected meaningful and dominant ancestor node instruction, said calculating a number of false alarms for said ascendants, G, of said selected meaningful and dominant ancestor node instruction, said labeling said selected meaningful and dominant ancestor node as not maximal meaningful when said calculated number of false alarms for said ascendants, G, of said selected meaningful and dominant ancestor node is less than or equal to said number of false alarms for said selected meaningful and dominant ancestor node instruction, said labeling said selected meaningful and dominant ancestor node as maximal meaningful when said calculated number of false alarms for said ascendants, G, of said selected meaningful and dominant ancestor node is not less than or equal to said number of false alarms for said selected meaningful and dominant node instruction, until each meaningful and dominant ancestor node in the set of meaningful and dominant ancestor nodes $\{K_1 \ldots K_n\}$ has been labeled either maximal meaningful or not maximal meaningful;

a readable storage device having computer readable program code stored thereon, wherein the computer readable program code includes computer executable instructions; and at least one instruction that, when executed by a computer, causes said computer to output in a tangible medium said maximal meaningful nodes.

11. The method of claim 10, wherein the number of said at least two pixilated images is two.

12. The method of claim 10, wherein the number of said at least two pixilated images is three.

13. A non-transitory computer-readable medium encoded for level set tree feature detection for measuring contrast changes in an image, comprising:
at least one instruction that, when executed by a computer, causes said computer to generate a fast level set tree transform of one pixilated image;
at least one instruction that, when executed by a computer, causes said computer to calculate node values based on statistical differences amongst said one pixilated image;
at least one instruction that, when executed by a computer, causes said computer to select a node from a set of nodes $\{I_1 \ldots I_n\}$;
  at least one instruction that, when executed by a computer, causes said computer to sum the number of pixels in a region corresponding to said selected node;
  at least one instruction that, when executed by a computer, causes said computer to calculate a number of false alarms for said selected node;
    at least one instruction that, when executed by a computer, causes said computer to store said number of false alarms for said selected node in an electronic storage device;
at least one instruction that, when executed by a computer, causes said computer to calculate relative entropy, $H_q(\{G_i\}_{i=1}^q)$, of said selected node, wherein $\{G_i\}_{i=1}^q$ are children of said selected node;
  wherein at least one instruction that, when executed by a computer, causes said computer to label said selected node as meaningful when said calculated number of false alarms for said selected node is less than a predetermined value $\epsilon$; or
  wherein at least one instruction that, when executed by a computer, causes said computer to label said selected node as not meaningful when said calculated number of false alarms for said selected node is not less than said predetermined value $\epsilon$;
at least one instruction that, when executed by a computer, causes said computer to iterate through said selecting a node from a set of nodes $\{I_1 \ldots I_n\}$ instruction, said summing the number of pixels in a region corresponding to said node instruction, said calculating a number of false alarms for said selected node instruction, said storing said number of false alarms for said selected node instruction, said calculating relative entropy, $H_q(\{G_i\}_{i=1}^q)$, of said selected node wherein $\{G_i\}_{i=1}^q$ are children of said selected node instruction, said labeling said selected node as meaningful when said calculated number of false alarms for said selected node is less than a predetermined value $\epsilon$ instruction, and said labeling said selected node as not meaningful when said calculated number of false alarms for said selected node is not less than said predetermined value $\epsilon$ instruction, until each node in the set of nodes $I_1 \ldots I_n$ has been labeled either meaningful or not meaningful;
at least one instruction that, when executed by a computer, causes said computer to select a meaningful node from a set of nodes $\{I_1 \ldots I_n\}$;
  at least one instruction that, when executed by a computer, causes said computer to determine a family of sibling descendants, $\{G_i\}_{i=1}^q$, of said selected node;
  at least one instruction that, when executed by a computer, causes said computer to calculate a number of false alarms for said family of sibling descendants, $\{G_i\}_{i=1}^q$, of said selected node;
    at least one instruction that, when executed by a computer, causes said computer to store said number of false alarms for said family of sibling descendants, $\{G_i\}_{i=1}^q$, of said selected node in an electronic storage device;
  wherein at least one instruction that, when executed by a computer, causes said computer to label said selected node as not meaningful when said calculated number of false alarms for said family of sibling descendants, $\{G_i\}_{i=1}^q$, of said selected node is less than or equal to said number of false alarms for said selected node; or
  wherein at least one instruction that, when executed by a computer, causes said computer to label said selected node as meaningful when said calculated number of false alarms for said family of sibling descendants, $\{G_i\}_{i=1}^q$, of said selected node is not less than or equal to said number of false alarms for said selected node;
at least one instruction that, when executed by a computer, causes said computer to iterate through said selecting a meaningful node from a set of nodes $\{I_1 \ldots I_n\}$ instruction, said determining a family of sibling descendants, $\{G_i\}_{i=1}^q$, of said selected node instruction, said calculating a number of false alarms for said family of sibling descendants, $\{G_i\}_{i=1}^q$, of said selected node instruction, said storing said number of false alarms for said family of sibling descendants, $\{G_i\}_{i=1}^q$, of said selected node instruction, said labeling said selected node as not meaningful when said calculated number of false alarms for said family of sibling descendants, $\{G_i\}_{i=1}^q$, of said selected node is less than or equal to said number of false alarms for said selected node instruction, said labeling said selected node as meaningful when said calculated number of false alarms for said family of sibling descendants, $\{G_i\}_{i=1}^q$, of said selected node is not less than or equal to said number of false alarms for said selected node instruction, until each node in the set of nodes $\{I_1 \ldots I_n\}$ has been labeled either meaningful or not meaningful;

at least one instruction that, when executed by a computer, causes said computer to select a meaningful node from a set of meaningful nodes $\{J_1 \ldots J_n\}$;

at least one instruction that when executed by a computer, causes said computer to determine individual descendants, G, of said selected meaningful node;

at least one instruction that, when executed by a computer, causes said computer to calculate a number of false alarms for said descendants, G, of said selected meaningful node;

wherein at least one instruction that, when executed by a computer, causes said computer to label said selected meaningful node as not a dominant ancestor when said calculated number of false alarms for said descendants, G, of said selected node is less than said number of false alarms for said selected meaningful node; or wherein at least one instruction that, when executed by a computer, causes said computer to label said selected meaningful node as a dominant ancestor when said calculated number of false alarms for said descendants, G, of said selected meaningful node is not less than said number of false alarms for said selected meaningful node;

at least one instruction that, when executed by a computer, causes said computer to iterate through said selecting a meaningful node from a set of meaningful nodes $\{J_1 \ldots J_n\}$ instruction, said determining individual descendants, G, of said selected meaningful node instruction, said calculating a number of false alarms for said descendants, G, of said selected meaningful node instruction, said labeling said selected meaningful node as not a dominant ancestor when said calculated number of false alarms for said descendants, G, of said selected meaningful node is less than said number of false alarms for said selected meaningful node instruction, said labeling said selected meaningful node as a dominant ancestor when said calculated number of false alarms for said descendants, G, of said selected meaningful node is not less than said number of false alarms for said selected meaningful node instruction, until each meaningful node in the set of meaningful nodes $\{J_1 \ldots J_n\}$ has been labeled either a dominant ancestor or not a dominant ancestor;

at least one instruction that, when executed by a computer, causes said computer to select a meaningful and dominant ancestor node from a set of meaningful and dominant ancestor nodes $\{K_1 \ldots K_n\}$;

at least one instruction that, when executed by a computer, causes said computer to determine individual ascendants, G, of said selected meaningful and dominant ancestor node;

at least one instruction that, when executed by a computer, causes said computer to calculate a number of false alarms for said ascendants, G, of said selected meaningful and dominant ancestor node;

wherein at least one instruction that, when executed by a computer, causes said computer to label said selected meaningful and dominant ancestor node as not maximal meaningful when said calculated number of false alarms for said ascendants, G, of said selected meaningful and dominant ancestor node is less than or equal to said number of false alarms for said selected meaningful and dominant ancestor node; or wherein at least one instruction that, when executed by a computer, causes said computer to label said selected meaningful and dominant ancestor node as maximal meaningful when said calculated number of false alarms for said ascendants, G, of said selected meaningful and dominant ancestor node is not less than or equal to said number of false alarms for said selected meaningful and dominant node;

at least one instruction that, when executed by a computer, causes said computer to iterate through said selecting a meaningful and dominant ancestor node from a set of meaningful and dominant ancestor nodes $\{K_1 \ldots K_n\}$ instruction, said determining individual ascendants, G, of said selected meaningful and dominant ancestor node instruction, said calculating a number of false alarms for said ascendants, G, of said selected meaningful and dominant ancestor node instruction, said labeling said selected meaningful and dominant ancestor node as not maximal meaningful when said calculated number of false alarms for said ascendants, G, of said selected meaningful and dominant ancestor node is less than or equal to said number of false alarms for said selected meaningful and dominant ancestor node instruction, said labeling said selected meaningful and dominant ancestor node as maximal meaningful when said calculated number of false alarms for said ascendants, G, of said selected meaningful and dominant ancestor node is not less than or equal to said number of false alarms for said selected meaningful and dominant node instruction, until each meaningful and dominant ancestor node in the set of meaningful and dominant ancestor nodes $\{K_1 \ldots K_n\}$ has been labeled either maximal meaningful or not maximal meaningful;

a readable storage device having computer readable program code stored thereon, wherein the computer readable program code includes computer executable instructions; and at least one instruction that, when executed by a computer, causes said computer to output in a tangible medium said maximal meaningful nodes.

14. The non-transitory computer-readable medium encoded for level set tree feature detection according to claim 13, wherein said tangible medium is a visual display screen.